United States Patent [19]

Strong

[11] 4,286,002
[45] Aug. 25, 1981

[54] URINATION COLLECTION PAD

[76] Inventor: Sylvia Y. Strong, 5434 Hillcrest Dr., Los Angeles, Calif. 90043

[21] Appl. No.: 98,474

[22] Filed: Nov. 29, 1979

[51] Int. Cl.³ .............................................. B32B 29/00
[52] U.S. Cl. ..................................... 428/74; 128/287; 428/136; 428/304; 428/326
[58] Field of Search ................. 428/68, 121, 131, 134, 428/192, 74, 136, 304, 326; 128/284, 287

[56] References Cited

U.S. PATENT DOCUMENTS

| | | | |
|---|---|---|---|
| 1,958,033 | 5/1934 | Cohn | 428/192 X |
| 2,284,944 | 6/1942 | Bruning | 128/284 X |
| 2,548,341 | 4/1951 | Bricmont | 128/290 R |
| 3,226,284 | 12/1965 | Curtis | 428/192 X |
| 3,326,740 | 6/1967 | Hand et al. | 428/224 |
| 3,814,101 | 6/1974 | Kozak | 128/287 |
| 3,945,386 | 3/1976 | Anczurowski et al. | 128/287 |
| 4,014,341 | 3/1977 | Karami | 128/287 |

*Primary Examiner*—Henry F. Epstein
*Attorney, Agent, or Firm*—Jack C. Munro

[57] ABSTRACT

A urination collection pad designed to be employed between the body of a bed ridden individual and the mattress of a bed. The pad is constructed of a bottom layer which is non-liquid permeable and upon which is located a quantity of shredded material to facilitate the absorption of liquid. A top layer of material, which permits the passage of liquid therethrough, is placed upon the absorbing layer. A soft resilient layer of material is secured upon the layer of material which permits the passage of liquid therethrough.

2 Claims, 3 Drawing Figures

URINATION COLLECTION PAD

BACKGROUND OF THE INVENTION

There are many instances in which an individual may be bed ridden. Not only may the individual be bed ridden because of advanced age, but also because of illness or injury.

Bed ridden individuals have to have some way of urinating. The urination is not always controlled by the individual, but may occur involuntarily. This means that the person will soak the bed, thereby requiring changing of the sheets and the mattress. Changing of the sheets and mattress is definitely a time consuming and costly operation.

There is a definite need for the employing of some type of device which will function to collect the urine and prevent passage of the urine through the bed sheet and on to the mattress. Previous to this invention, there has been no known type of structure to achieve this result.

SUMMARY OF THE INVENTION

The structure of this invention is summarily described in the Abstract of the Disclosure and reference is to be had thereto.

The primary objective of this invention is to employ a collection pad which can be comfortably located beneath the bed ridden individual, wherein the pad is to effectively contain and absorb urine.

Another objective of this invention is to construct a pad inexpensively so that the pad can be readily disposed of after use.

DETAILED DESCRIPTION OF THE SHOWN EMBODIMENT

Figure 1:
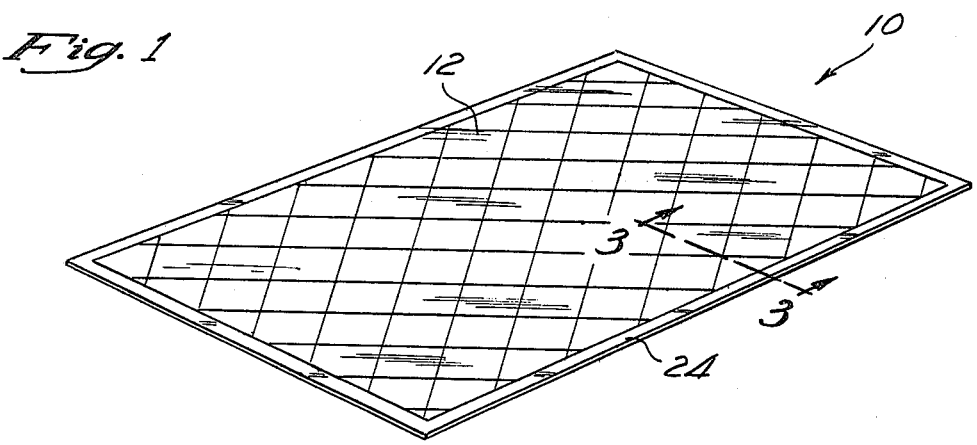
FIG. 1 is an isometric view of the pad of this invention.
Figure 2:
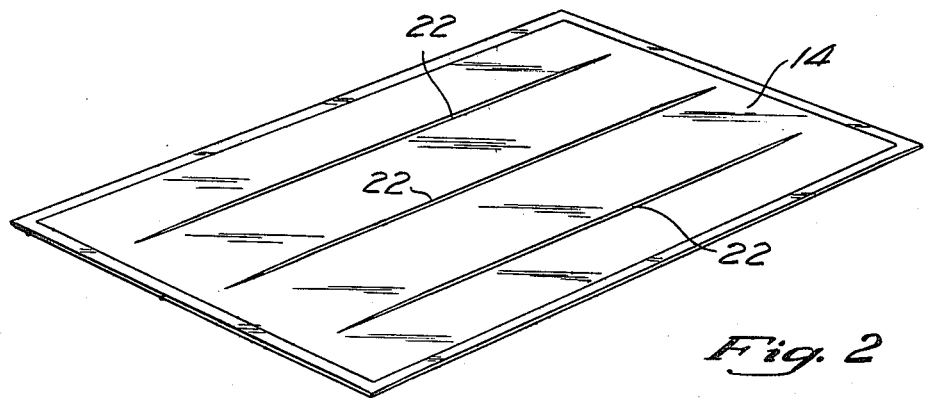
FIG. 2 is an isometric view of the pad of this invention wherein the upper cloth layer of the pad has been removed.
Figure 3:
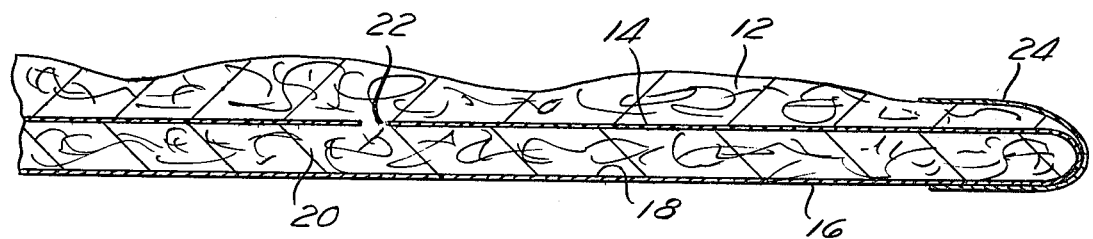
FIG. 3 is a cross-sectional view taken along line 3—3 of FIG. 1.

Referring particularly to the drawing, there is shown the pad 10 of this invention composed primarily of a top layer 12 which is secured on an encasing layer 14 and which in turn is secured at the side thereof to a bottom layer 16.

The bottom layer 16, as well as the encasing layer 14, is to be formed of a thin, sheet material, plastic. The bottom layer 16 is to not permit passage of liquid therethrough. The normal method of connection between the layers 14 and 16 will be by heat sealing or other type of bonding.

Formed between the encasing layer 14 and the bottom layer 16 is an internal chamber 18. To be contained within the internal chamber 18 is a quantity of liquid absorbing material 20, such as shredded paper. It is to be understood that numerous types of different material 20 could be employed.

In order to let liquid come into contact with material 20, there is formed a plurality of spaced-apart elongated slits 22 within the encasing layer 14. It is considered to be within the scope of this invention that other means to permit the passage of liquid through the encasing layer 14 could be employed, such as a plurality of small openings.

The top soft resilient layer 12 is secured to the encasing layer 14 at its peripheral edge thereof by means of an overlapping flange 24. The overlapping flange 24 is composed of plastic and is fixedly secured by heat sealing to the peripheral edge of the encasing layer 14.

The operation of the pad of this invention will require the buttocks of the bed ridden individual to be located upon the quilted cloth pad of layer 12. Upon the individual urinating, the urine is to be conducted through the layer 12 and into the area of the encasing layer 14. The urine is then to be conducted through the elongated slits 22 to be then absorbed by the shredded layer 20. After urination, the entire pad 10 is to be disposed of and a new pad employed.

It is to be understood that the pad 10 of this invention fills a long-felt need in hospitals, homes, nursing homes and the like to avoid the continuing soiling of bed sheets and mattresses. The pad of this invention substantially lowers laundry costs.

What is claimed is:

1. A urination collection pad designed to be used by bed ridden individuals, said pad adapted to be located between the buttock area of the individual and the mattress of the bed, said pad comprising:

a bottom layer adapted to be located against the mattress, said bottom layer being non-liquid permeable;

a liquid absorbent layer located on said bottom layer, said liquid absorbent layer comprising shredded paper;

an encasing layer of material located against said liquid absorbent layer on the side opposite said bottom layer, said encasing layer being attached to said bottom layer and located about the periphery of said liquid absorbent layer, said encasing layer permitting passage of liquid therethrough; and a soft resilient layer of material attached upon said encasing layer and substantially covering such, said soft resilient layer being secured to said encasing layer by means of an overlapping flange, said overlapping flange binding together the periphery of said soft resilient layer and the periphery of said encasing layer and the periphery of said bottom layer, said soft resilient layer of material comprising quilted cloth, whereby said soft resilient layer is to be in direct contact with the individual's skin to facilitate comfortable contact therewith.

2. The pad as defined in claim 1 wherein:

said encasing layer includes a plurality of spaced-apart slits, said slits to permit passage of liquid therethrough.

* * * * *